(12) United States Patent
Hiraoka (10) Patent No.: US 9,758,683 B2
(45) Date of Patent: Sep. 12, 2017

(54) PHOTOPOLYMERIZABLE COMPOSITION, PHOTOPOLYMERIZABLE INKJET INK, AND INK CARTRIDGE

(71) Applicant: Takao Hiraoka, Kanagawa (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/428,198

(22) PCT Filed: Sep. 27, 2013

(86) PCT No.: PCT/JP2013/077012
§ 371 (c)(1),
(2) Date: Mar. 13, 2015

(87) PCT Pub. No.: WO2014/054763
PCT Pub. Date: Apr. 10, 2014

(65) Prior Publication Data
US 2015/0232676 A1    Aug. 20, 2015

(30) Foreign Application Priority Data

Oct. 5, 2012 (JP) ................. 2012-222728
Apr. 3, 2013 (JP) ................. 2013-077468

(51) Int. Cl.
*C09D 11/107* (2014.01)
*C08K 5/5419* (2006.01)
*C09D 11/38* (2014.01)

(52) U.S. Cl.
CPC .......... *C09D 11/107* (2013.01); *C08K 5/5419* (2013.01); *C09D 11/38* (2013.01)

(58) Field of Classification Search
None
See application file for complete search history.

(56) References Cited

U.S. PATENT DOCUMENTS 6,099,415 A * 8/2000 Lutz ................. B41M 1/40
                                                      473/357
6,335,382 B1 * 1/2002 Iida ................. 522/93
(Continued)

FOREIGN PATENT DOCUMENTS

CN    102193312 A    9/2011
EP    1 865 034 A1   12/2007
(Continued)

OTHER PUBLICATIONS

International Search Report Issued for counterpart International Patent Application No. PCT/JP2013/077012 dated Dec. 17, 2013.
(Continued)

*Primary Examiner* — An Do
*Assistant Examiner* — Renee I Wilson
(74) *Attorney, Agent, or Firm* — Oblon, McClelland, Maier & Neustadt, L.L.P.

(57) ABSTRACT

To provide a non-aqueous photopolymerizable composition, which contains: a polymerizable monomer; a polymerization initiator; and a polyether-modified polysiloxane compound represented by the following general formula (1): <General Formula (1)> $(CH_3)_3Si—O—[Si(CH_3)_2—O]_a—[Si(CH_3)(X)—O]_b—Si(CH_3)_3$ where X represents $R(C_2H_4O)_c(C_3H_6O)_d—R'$, R is a single bond or an alkylene group, R' is a hydrogen atom or an alkyl group, and a to d each denote an average polymerization degree including a case where either c or d is 0.

20 Claims, 1 Drawing Sheet

(56) References Cited

U.S. PATENT DOCUMENTS

| | | | |
|---|---|---|---|
| 2003/0199655 A1 | 10/2003 | Yurugi et al. | |
| 2004/0145639 A1 | 7/2004 | Noutary | |
| 2005/0124728 A1* | 6/2005 | Komatsu et al. | 523/160 |
| 2007/0289484 A1 | 12/2007 | Yamaguchi et al. | |
| 2009/0087627 A1* | 4/2009 | Watanabe | C09D 11/101 428/195.1 |
| 2009/0148648 A1* | 6/2009 | Aoki et al. | 428/64.4 |
| 2009/0226675 A1* | 9/2009 | Takahashi | C09D 11/101 428/195.1 |
| 2011/0033650 A1* | 2/2011 | Kitsunai et al. | 428/64.4 |
| 2011/0159251 A1 | 6/2011 | Sato et al. | |
| 2012/0086762 A1 | 4/2012 | Noguchi et al. | |
| 2012/0147103 A1 | 6/2012 | Hasegawa et al. | |
| 2012/0176456 A1 | 7/2012 | Maekawa et al. | |
| 2012/0200648 A1 | 8/2012 | Hiraoka et al. | |
| 2012/0242768 A1 | 9/2012 | Seno et al. | |
| 2012/0293589 A1 | 11/2012 | Hiraoka | |
| 2013/0065024 A1 | 3/2013 | Aruga et al. | |
| 2013/0321539 A1 | 12/2013 | Hiraoka | |

FOREIGN PATENT DOCUMENTS

| | | |
|---|---|---|
| EP | 2 444 429 A1 | 4/2012 |
| JP | 2004-526820 | 9/2004 |
| JP | 3936724 | 3/2007 |
| JP | 2008-149208 | 7/2008 |
| JP | 2010-083933 | 4/2010 |
| JP | 2011-148950 | 8/2011 |
| JP | 2011-164296 | 8/2011 |
| JP | 2011-177639 | 9/2011 |
| JP | 2011-215311 | 10/2011 |
| JP | 2012-102314 | 5/2012 |
| JP | 2012-140593 | 7/2012 |
| JP | 2013-181114 | 9/2013 |
| KR | 10-2012-0038360 | 4/2012 |
| RU | 2 049 095 C1 | 11/1995 |
| TW | 201216000 A1 | 4/2012 |
| WO | WO 2005/030879 A2 | 4/2005 |
| WO | WO 2006/046698 A1 | 5/2006 |
| WO | WO 2013/129699 A1 | 9/2013 |

OTHER PUBLICATIONS

Combined Office Action and Search Report issued Oct. 19, 2015 in Chinese Patent Application No. 201380052104.0 (with English translation).

Extended European Search Report issued Oct. 6, 2015 in Patent Application No. 13843124.2.

Korean Office Action dated Jan. 4, 2016 in Patent Application No. 10-2015-7008466 (with English-language Translation).

Combined Office Action and Search Report issued Jun. 21, 2016 in Russian Patent Application No. 2015116897 (with English language translation).

* cited by examiner

PHOTOPOLYMERIZABLE COMPOSITION, PHOTOPOLYMERIZABLE INKJET INK, AND INK CARTRIDGE

TECHNICAL FIELD

The present invention relates to a photopolymerizable composition, a photopolymerizable inkjet ink, and an ink cartridge housing the ink.

BACKGROUND ART

Photopolymerizable compositions and photopolymerizable inkjet inks using (meth)acrylic acid esters have been widely known (see PTL 1).

However, many of monomers used in conventional photopolymerizable inkjet inks are toxic. Especially, most of (meth)acrylic acid esters, which are readily available with low cost, have high toxicity in terms of skin sensitivity, which causes allergy reactions with skin upon contact with them. Conventional art has not yet provided any solution to this problem.

Based on the studies conducted so far, the present inventors have found a few (meth)acrylic acid ester and (meth)acryl amide, which have no problem in skin sensitization. As for one of examples thereof, proposed is an inkjet ink containing methacrylate as a main component, as methacrylate is lower in toxicity in terms of skin sensitization than acrylate, as disclosed in Japanese Patent Application No. 2010-278177, and PTL 2. In order to further improve the performances, it was been desired to improve a strength of a cured coating film to enhance durability thereof against abrasions or the like, and to reduce a viscosity so that it can be ejected by inkjet without any problem even when an ink increases its viscosity as a result of formulated various materials, such as a pigment, and additives, therein. To reduce viscosity of an ink, water can be blended therein, and a photopolymerizable aqueous inkjet ink, to which water is blended, has been known. As described later, however, such ink is not penetrated and dried on a non-absorbent base. Use of such ink requires a step for evaporating water in order to increase speed or attain efficiency of a process. Moreover, a heat source is desired to be provided. Therefore, it is not preferable in view of energy saving. In the case where the photopolymerizable composition is used as a coating material used for brush coating, an organic solvent can be used therein. However, the organic solvent is evaporated and released in the atmosphere. In view of a possible influence to the environment, use of the organic solvent is preferably as little as possible. In the case where the photopolymerizable composition is used as an inkjet ink, if an organic solvent blended therein is highly volatile, the ink in a nozzle, through which the ink is jetted, increases its viscosity due to vaporization of the organic solvent, which may cause a problem in jetting. Therefore, such ink is not preferable.

In view of these points mentioned above, the present inventors have invented technologies disclosed in Japanese Patent Application Nos. 2012-46301 and 2012-113970. Considering an object for improving a coating film strength under the situation that polymerization reactivity is more or less sacrificed as materials are formulated in view of reduction in skin sensitization, it is very important to further improve scratch resistance of a surface of a coating film using a method other than acceleration of a polymerization reaction for the purpose of protecting surfaces of housing or molded articles using the photopolymerizable composition, which is an important task together with a task for attaining excellent appearance, such as high glossiness, achieved by forming uniform a surface of a coating film without any irregularities.

Moreover, if a solid coating film is produced using the photopolymerizable composition, not by printing a certain image pattern, not only an inkjet system, but also a method, such as spray coating, and brush coating, can be employed. It is however difficult to provide a coating film, which has no problem of skin sensitization, and has high strength and excellent appearance, regardless of a coating system.

CITATION LIST

Patent Literature

PTL 1: Japanese Patent Application Laid-Open (JP-A) No. 2004-526820
PTL 2: JP-A No. 2012-140593

SUMMARY OF INVENTION

Technical Problem

The present invention aims to provide a photopolymerizable composition, which has no problem of skin sensitization, achieve both low viscosity and improved strength of a cured coating film, and also achieve an improvement in appearance of the cured coating film.

Solution to Problem

As the means for solving the aforementioned problems, the non-aqueous photopolymerizable composition of the present invention containing:
a polymerizable monomer;
a polymerization initiator; and
a polyether-modified polysiloxane compound represented by the following general formula (1):

$(CH_3)_3Si-O-[Si(CH_3)_2-O]_a-[Si(CH_3)(X)-O]_b-Si(CH_3)_3$    <General Formula (1)> where X represents $R(C_2H_4O)_c(C_3H_6O)_d-R'$, R is a single bond or an alkylene group, R' is a hydrogen atom or an alkyl group, and a to d each denote an average polymerization degree including a case where either c or d is 0.

Advantageous Effects of Invention

The present invention can provide a photopolymerizable composition, which has no problem of skin sensitization, achieve both low viscosity and improved strength of a cured coating film, and also achieve an improvement in appearance of the cured coating film.

Moreover, the photopolymerizable composition is easily handled, as odor thereof is weak, and a coated product obtained using the photopolymerizable composition has no problem of skin sensitization even if a small amount of an uncured monomer component is remained, and does not cause skin sensitization even when it is touched with hands or fingers. Accordingly, high safety can be secured.

DESCRIPTION OF EMBODIMENTS (Non-Aqueous Photopolymerizable Composition)

The non-aqueous photopolymerizable composition of the present invention contains at least polymerizable monomer, a polymerization initiator, and a polyether-modified polysiloxane compound represented by the following general formula (1), and may further contain other components, if necessary.

<General Formula (1)>

In the formula above, X represents $R(C_2H_4O)_c(C_3H_6O)_d$—R', R is a single bond or an alkylene group, R' is a hydrogen atom or an alkyl group, and a to d each denote an average polymerization degree including a case where either c or d is 0.

<Polymerizable Monomer>

The photopolymerizable composition (may referred to as "ink" hereinafter) is a composition prepared by blending a polymerization initiator in addition to methacrylic acid ester and/or acrylic acid ester serving as a polymerizable monomer negative for skin sensitization, to give a viscosity that can be ejectable by inkjet. As a countermeasure for a problem that such photopolymerizable composition cannot form a coating film that is smooth and having excellent appearance, the present inventors have found that leveling of the photopolymerizable composition is improved by blending therein the polyether-modified polysiloxane compound represented by the general formula (1) to thereby form a coating film that is smooth and has excellent appearance, as well as improving the coating film strength.

Here, the photopolymerizable monomer negative for skin sensitization refers to a compound that satisfies at least one of the following skin sensitization evaluations (1) to (3).

(1) A compound having a Stimulation Index (SI value) of less than 3, where the Stimulation Index indicates the level of sensitization as measured by a skin sensitization test based on the LLNA (Local Lymph Node Assay).

(2) A compound evaluated as "negative for skin sensitization" or "no skin sensitization" in its material safety data sheet (MSDS).

(3) A compound evaluated as "negative for skin sensitization" or "no skin sensitization" in the literature [e.g., Contact Dermatitis 8 223-235 (1982)].

Regarding the above (1), the compound having a SI value of less than 3 is considered negative for skin sensitization as described in literatures, for example, "Functional Material" (Kino Zairyou) 2005, September, Vol. 25, No. 9, p. 55. The lower SI value means lower skin sensitization. Thus, in the present invention, a monomer having lower SI value is preferably used. The SI value of the monomer used is preferably less than 3, more preferably 2 or lower, even more preferably 1.6 or lower.

Among (meth)acrylic acid esters, which are polymerizable monomers readily available at low cost, those negative for skin sensitization have low polymerization reactivity. In order to give sufficient curing property to a resulting photopolymerizable monomer on practical use, an amount of the polymerization initiator is preferably 10 parts by mass or greater relative to 100 parts by mass of the polymerizable monomer. When an excessive amount of the polymerization initiator is blended, other resistance, such as light fastness, is deteriorated. Accordingly, the amount thereof is preferably 20 parts by mass or smaller.

In order to improve leveling the photopolymerizable composition to improve an appearance of a resulting coating surface, an amount of the polyether-modified polysiloxane compound represented by the general formula (1) is preferably 0.1 parts by mass or greater, more preferably 0.1 parts by mass to 4 parts by mass, relative to 100 parts by mass of the polymerizable monomer. When the amount thereof is excessively small, a sufficient effect cannot be attained. When the amount thereof is excessively large, the polyether-modified polysiloxane compound may inhibit photocuring. Accordingly, the amount of the polyether-modified polysiloxane compound is even more preferably 0.1 parts by mass to 1 parts by mass.

Examples of the monomer negative for skin sensitization include caprolactone-modified dipentaerythritol hexaacrylate (negative: evaluated in MSDS), polyethoxylated tetramethylol methane tetracrylate (1.7), ethylene oxide-modified bisphenol A diacrylate (1.2), caprolactone-modified hydroxypivalic acid neopentyl glycol diacrylate (0.9), hydroxyethyl acrylamide (no: evaluated in MSDS), polypropylene glycol diacrylate [$CH_2$=CH—CO—($OC_3H_6$)$_n$—OCOCH=$CH_2$(n≈12)](1.5), tricyclodecane dimethanol dimethacrylate (1.3), polyethylene glycol dimethacrylate [$CH_2$=CH—CO—($OC_2H_4$)$_n$—OCOCH=$CH_2$(n≈14)] (1.6), polyethylene glycol dimethacrylate [$CH_2$=CH—CO—($OC_2H_4$)$_n$—OCOCH=$CH_2$(n≈9)](1.3), diethylene glycol dimethacrylate (1.1), trimethylol propane trimethacrylate (1.9), ethylene oxide-modified trimethylol propane trimethacrylate (1.0), γ-butyrolactone methacrylate (2.1), stearyl acrylate (2.7), neopentyl glycol dimethacrylate (2.0), 1,4-butanediol dimethacrylate (2.6), glycerol dimethacrylate (1.2), triethylene glycol divinyl ether (no: evaluated in MSDS), t-butyl methacrylate (negative: evaluated in the literature), n-pentyl methacrylate (negative: evaluated in the literature), and n-hexyl methacrylate (negative: evaluated in the literature). Among them, diethylene glycol dimethacrylate is particularly preferable, as it has low viscosity, which is easily used for an inkjet ink, and has excellent curing property. For the use of a photopolymerization composition required to form a solid coating film, caprolactone-modified dipentaerythritol hexaacrylate, and ethylene oxide-modified trimethylol propane trimethacrylate are preferably used in combination, as they are not sufficiently low in viscosity per se, but they are excellent particularly in curing properties, and are excellent in stability in the dark place.

In addition to the monomer negative for skin sensitization, moreover, the following (meth)acrylate, and (meth)acryl amide, which may have a problem of skin sensitization as used alone, or which is a compound whose skin sensitization has not been confirmed, can be used in combination, provided that they do not adversely affect a resulting photopolymerizable composition.

Examples of such (meth)acrylate and (meth)acryl amide include ethylene glycol di(meth)acrylate, hydroxy pivalic acid neopentyl glycol di(meth)acrylate, γ-butyrolactone acrylate, isobornyl(meth)acrylate, formulated trimethylol propane mono(meth)acrylate, polytetramethylene glycol di(meth)acrylate, trimethylol propane (meth)acrylic acid benzoate, diethylene glycol diacrylate, triethylene glycol di(meth)acrylate, tetraethylene glycol di(meth)acrylate, polyethylene glycol di(meth)acrylate [$CH_2$=CH—CO—($OC_2H_4$)n-OCOCH=$CH_2$ (n≈4)], $CH_2$=CH—CO—($OC_2H_4$)n-OCOCH=$CH_2$ (n≈9)], $CH_2$=CH—CO—($OC_2H_4$)n-OCOCH=$CH_2$ (n≈14)], $CH_2$=CH—CO—($OC_2H_4$)n-OCOCH=$CH_2$ (n≈23)], dipropylene glycol di(meth)acrylate, tripropylene glycol di(meth)acrylate, polypropylene glycol dimethacrylate [CH$_2$=C(CH$_3$)—CO—(OC$_3$H$_6$)n-OCOC(CH$_3$)=CH$_2$ (n≈7)], 1,3-dibutanediol diacrylate, 1,4-dibutanediol di(meth)acrylate, 1,6-hexanediol di(meth)acrylate, 1,9-nonanediol di(meth)acrylate, neopentyl glycol di(meth)acrylate, tricyclodecane dimethanol di(meth)acrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl(meth)acryl amide, propylene oxide-modified tetramethylol methane tetra(meth)acrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane triacrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta(meth)acrylate, and polyurethane poly(meth)acrylate.

<Photoradical Polymerization Initiator>

To the photopolymerizable composition (ink) of the present invention, a photoradical polymerization initiator is preferably used. (Meth)acrylic ester and (meth)acryl amide have been known to have ionic polymerization property as well. Ionic polymerization initiators are typically expensive and also generate a slight amount of strong acid and strong alkali even in the state where there is any irradiation of light. Therefore, it is necessary to take special cares, such as imparting acid or alkali resistance to an ink supply channel inside an inkjet coating system. Accordingly, there is limitation on the choice of a member constituting an inkjet coating system.

In contrast, the photopolymerizable composition (ink) of the present invention can use a photoradical polymerization initiator that is inexpensive and generates no strong acid or strong alkali. Therefore, it is possible to produce a photopolymerization composition at low cost, and also it is easy to elect a member constituting an inkjet coating system. Note that, in the case where a quite high energy light source, such as electron beams, α rays, β rays, γ rays or X rays, a polymerization reaction can proceed without polymerization initiator. This is a conventionally known matter, and has a problem, such as a facility thereof is very expensive and maintenance thereof is complicated. Therefore, it is not particularly described in details in the present specification.

The photoradical polymerization initiator includes, for example, a self-cleaving photopolymerization initiator and a hydrogen-abstracting polymerization initiator. Other than those used in Examples, any of the following compounds may be used in combination.

Examples of the self-cleaving photopolymerization initiator include 2,2-dimethoxy-1,2-diphenylethan-1-one, 1-[4-(2-hydroxyethoxyl)-phenyl]-2-hydroxy-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl) butan-1-one, bis(2,4,6-trimethylbenzoyl) phenylphosphine oxide, bis(2,6-dimethoxybenzolyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone.

Examples of the hydrogen-abstracting polymerization initiator include: benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

Moreover, amine may be used in combination as a polymerization accelerator.

Examples of the polymerization accelerator include: an aromatic amine compound, such as ethyl-p-dimethylaminobenzoate, 2-ethylhexyl-p-dimethylaminobenzoate, methyl p-dimethylaminobenzoate, 2-dimethylaminoethyl benzoate and butoxyethyl-p-dimethylaminobenzoate; and a non-aromatic amine compound, such as N-methyldiethanol amine.

<Other Components>

Examples of other components include a colorant, a polymerization inhibitor, a surfactant, and a polar group-containing high molecular pigment dispersant.

—Colorant—

The photopolymerizable composition may be made transparent without containing a colorant, and may contain a colorant, if necessary. In the case where a clear or white photopolymerizable composition is desirable, it is preferred that less tinted materials be selected for the aforementioned materials, such as the polymerization initiator, and the polymerization accelerator, and the below-mentioned materials other than the colorant.

As for the colorant in the case where the photopolymerizable composition is tinted, any of conventional inorganic pigments or organic pigments can be used.

As for the black pigment, carbon black produced by a furnace method or a channel method can be used.

Examples of the yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of the magenta pigment include pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of the cyan pigment include pigment of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of the white pigment or clear filler for modifying physical properties include: sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

In addition, various inorganic or organic pigments may optionally be used considering, for example, physical properties of the photopolymerizable composition.

—Polymerization Inhibitor—

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenyl methane, p-benzoquinone, di-t-butylbutyl diphenylamine, 9,10-di-n-butoxyanthracene, 4,4'-[1,10-dioxo-1,10-decandiylbis(oxy)]bis[2,2,6,6-tetramethyl]-1-piperidinyloxy.

—Surfactant—

Examples of the surfactant include higher fatty acid ester containing polyether, an amino group, a carboxyl group, or a hydroxyl group, and a fluoroalkyl compound containing polyether, an amino group, a carboxyl group, or a hydroxyl group.

(Ink Cartridge)

The inkjet ink of the present invention may be housed in a container, and can be used as an ink cartridge. With this form, users do not have to directly touch the ink during operations such as exchange of the ink, and thus they are not concerned with staining of their fingers, hands or clothes. In addition, it is possible to prevent interfusion of foreign matter such as dust into the ink.

The container is not particularly limited, and the shape, structure, size and material thereof may be appropriately selected depending on the intended purpose. For example, the container is preferably selected from those having an ink bag formed of an aluminum laminate film, or a resin film.

Figure 1:
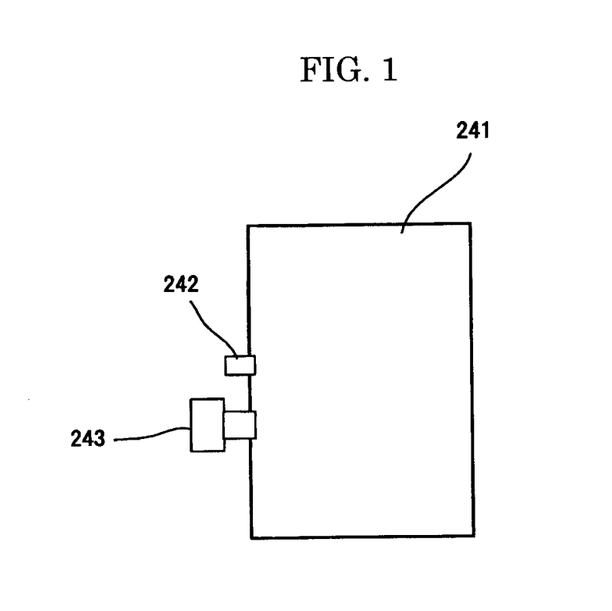
FIG. 1 is a schematic diagram illustrating one example of an ink bag of an ink cartridge.
Figure 2:
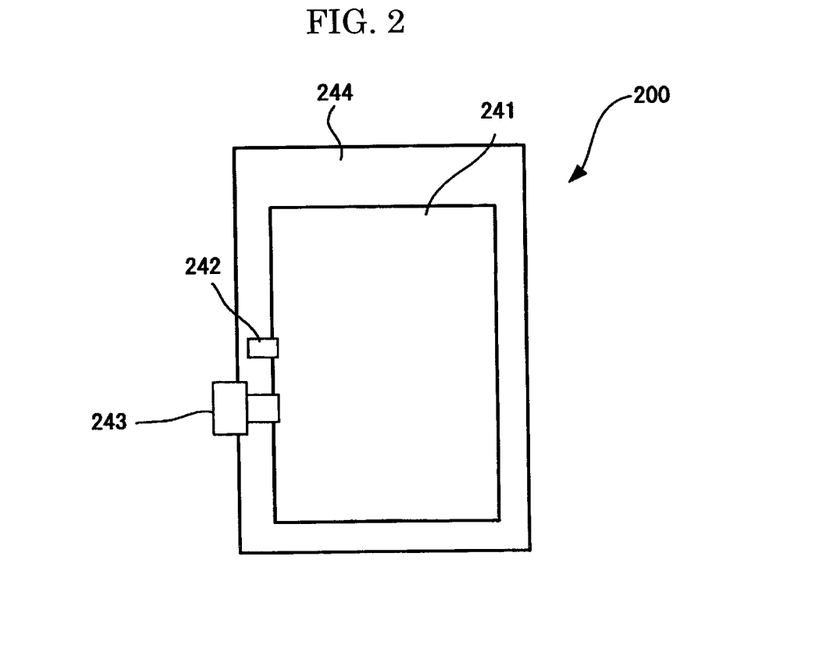
FIG. 2 is a schematic diagram illustrating one example of the ink cartridge housing the ink bag.

The ink cartridge will be described with reference to FIGS. 1 and 2. FIG. 1 is a schematic diagram illustrating one example of the ink bag 241 of the ink cartridge, and FIG. 2 is a schematic diagram illustrating the ink cartridge 200 housing the ink bag 241 of FIG. 1 in the cartridge case 244 thereof.

As illustrated in FIG. 1, the ink bag 241 is filled with the ink by injecting the ink from an ink inlet 242. After removing the air present inside the ink bag 241, the ink inlet 242 is sealed by fusion bonding. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 2, the ink bag 241 is typically housed in a plastic cartridge case 244, which is then detachably mounted in use to various inkjet recording devices as the ink cartridge 200.

The ink cartridge of the present invention is preferably detachably mounted in inkjet recording devices. As a result of this, refill or replacement of the ink can be simplified, and workability can be improved.

As for a coating base, paper, plastic, metal, ceramic, glass, or a composite material thereof may be used. Since an absorbent base, such as wood free paper, can expect an effect of penetrating and drying, an aqueous ink or an oil ink, which is not a quick-drying ink, can be used for such base. On the other hand, it is practical to use a quick-drying ink for a base of low absorbency or a non-absorbent base, such as gloss coat paper, a plastic film, a plastic molded article, ceramic, glass, metal, and rubber.

The ink of the present invention does not particularly restrict a base to be used. As the ink is cured immediately upon application of light, however, the aforementioned non-absorbent base is particularly preferable. Among them, suitable are plastic films and a plastic molded articles formed of polyethylene, polypropylene, polyethylene terephthalate, polycarbonate, an ABS resin, polyvinyl chloride, polystyrene, other polyesters, polyamide, vinyl-based materials, and composite materials thereof.

EXAMPLES

The present invention will be concretely explained through Examples and Comparative Examples hereinafter, but Examples shall not be construed as to limit the scope of the present invention.

<Evaluation Method of SI Value>

According to the skin sensitization test based on the LLNA (Local Lymph Node Assay), the SI value was measured in the below described manner.

[Test Material]

<<Positive Control>>

$\alpha$-Hexylcinnamaldehyde (HCA; product of Wako Pure Chemical Industries, Ltd.) was used as the positive control.

<<Vehicle>>

As a vehicle, a mixture containing acetone (product of Wako Pure Chemical Industries, Ltd.) and olive oil (product of Fudimi Pharmaceutical Co., Ltd.) in a volume ratio of 4/1 was used.

<<Animals Used>>

Before treated with the test substances, the positive control or the vehicle control, female mice were acclimated for 8 days including 6-day quarantine. No abnormalities were found in all the animals during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each animal was 8 weeks old to 9 weeks old at the time of the initiation of sensitization. The animals remaining after the categorization were excluded from the test.

The animals were individually identified by application of oil ink to their tale throughout the test period, and also their cages were labeled for identification.

<<Housing Environment>>

Throughout the housing period including the quarantine/acclimation period, the animals were housed in an animal room with barrier system, which was set as follows: 21° C. to 25° C. in temperature, 40% to 70% in relative humidity, 10 times/hour to 15 times/hour in frequency of air circulation, and 12 hours in lighting cycle (lighting from 7:00 to 19:00).

The housing cages used were those made of polycarbonate, and four animals were housed in each cage.

The animals were given adlibitum solid diet for laboratory animals MF (product of Oriental Yeast Co., Ltd.). Also, using a water-supply bottle, they were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The diet and feeding equipment were sterilized with an autoclave (121° C., 30 min) before use.

The cage and bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group composition used for the measurement of the Si value is shown in Table 1.

TABLE 1

| Test group | Sensitization substance | Sensitization dose (μL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with a vehicle. The thus-prepared solution was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control Substance>>

About 0.25 g of HCA was accurately weighed, and a vehicle was added to the HCA to have the volume of 1 mL, to thereby prepare a 25.0 w/v % solution. The thus-prepared solution was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed. Then, physiological saline (product of OTSUKA PHARMACEUTICAL CO., LTD.) was added to the measuring flask, and dissolved through application of ultrasonic waves. The volume of the resultant solution was adjusted to 20 mL to prepare a 10 mg/mL solution (BrdU preparation). The thus-prepared solution was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU solution was prepared 2 days before administration and stored in a cold place until the day of administration.

[Sensitization and Administration of BrdU]

<<Sensitization>>

Each (25 μL) of the test substance preparations, the positive control preparation and the vehicle was applied to both the auricles of each animal using a micropipetter. This treatment was performed once a day for three consecutive days.

<<Administration of BrdU>>

About 48 hours after the final sensitization, the BrdU preparation (0.5 mL) was intraperitoneally administered once to each animal.

[Observation and Examination]

<<General Conditions>>

All the animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<<Measurement of Body Weights>>

The body weight of each animal was measured on the day of the initiation of sensitization and on the day of the removal of the auricular lymph node (i.e., the day when the animals were transferred from the animal room). Also, the average of the body weights and the standard error thereof were calculated for each group.

<<Removal of Auricular Lymph Node and Measurement of Mass Thereof>>

About 24 hours after the administration of BrdU, the animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returned to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

[Evaluation of Results]

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Notably, the SI value was rounded at the second decimal place and shown to the first decimal place.

$$SI = \frac{\text{Average of measurements of } BrdU \text{ intake for each individual(average of 3 wells)}}{\text{Average of measurements of } BrdU \text{ intake in the vehicle control group(average of 4 animals)}}$$

Example 1

An ink of Example 1 having a viscosity of 8 mPa·s at 25° C. was obtained by blending materials of the following (a) to (d) with the blending ratio as presented in Table 3-1.

| a: (meth)acrylic acid ester | |
|---|---|
| a1: diethylene glycol dimethacrylate (2G (1.1), manufactured by Shin-Nakamura Chemical Co., Ltd.) | 95 |
| a2: caprolactone dipentaerythritol hexaacrylate (TMPT-3EO (3.1), manufactured by Shin-Nakamura Chemical Co., Ltd.) | 5 |
| a3: ethylene oxide-modified trimethylol propane trimethacrylate | 0 |
| b: polymerization initiator | |
| b1: 1-hydroxycyclohexylphenyl ketone | 20 |
| c: polyether-modified polysiloxane compound | |
| c1: $(CH_3)Si-O-[Si(CH_3)_2-O]_a-[Si(CH_3)(X)-O]_b-Si(CH_3)_3$ | 0.1 |
| d: (meth)acrylic acid ester other than the (a) | 0 |

(a) (meth)acrylic acid ester negative for skin sensitization
(b) photoradical polymerization initiator
(c) polyether-modified polysiloxane compound The details of a1 to a3, b1 to b4, c1 to c7, and d1 to d3 in Tables 3 to 5 are as follows. The numerical value in the parenthesis described after each product name is the SI value in the LLNA test in the (1). The description "no" after each product name means that the product is evaluated as "negative for skin sensitization" or "no skin sensitization" in the MSDS (Material Safety Data Sheet) described in the above skin sensitization evaluation (2). Similarly, the description "yes" after each product name means that the product is evaluated as "positive for skin sensitization" or "skin sensitization" in the MSDS.

[(a) (Meth)Acrylic Acid Ester Negative for Skin Sensitization]

a1: diethylene glycol dimethacrylate, 2G (1.1), manufactured by Shin-Nakamura Chemical Co., Ltd.

a2: caprolactone-modified dipentaerythritol hexaacrylate, DPCA 60 (no: evaluated in MSDS), manufactured by NIPPON KAYAKU Co., Ltd.

a3: ethylene oxide-modified trimethylol propane trimethacrylate, TMPT-3EO (1.0), manufactured by Shin-Nakamura Chemical Co., Ltd.

[(b) Photoradical Polymerization Initiator]

b1: 1-hydroxycyclohexyl phenyl ketone, Irgacure184 (no: evaluated in MSDS), manufactured by BASF b2: 2-hydroxy-2-methyl-1-phenylpropan-1-one, Darocur1173 (no: evaluated in MSDS), manufactured by BASF b3: 2-hydroxy-1-{4-[4-(2-hydroxy-2-methylpropionyl)benzyl]phenyl}-2-methyl-1-propan-1-one, Irgacure127 (no: evaluated in MSDS), manufactured by BASF b4: oligo[2-hydroxy-2-methyl-1{4-(1-methylvinyl)phenyl}propanone], ESACURE KIP150 (no: evaluated in MSDS), manufactured by Lamberti

[(c) (Polyether-Modified) Polysiloxane Compound]

c1: polyether-modified polysiloxane represented by the general formula, $(CH_3)_3Si-O-[Si(CH_3)_2-O]_a-[Si(CH_3)(X)-O]_b-Si(CH_3)_3$, KF353, manufactured by Shin-Etsu Chemical Co., Ltd.

c2: polyether-modified polysiloxane represented by the general formula, $(CH_3)_3Si-O-[Si(CH_3)_2-O]_a-[Si(CH_3)(X)-O]_b-Si(CH_3)_3$, KF351A, manufactured by Shin-Etsu Chemical Co., Ltd.

c3: polyether-modified polysiloxane represented by the general formula, $(CH_3)_3Si-O-[Si(CH_3)_2-O]_a-[Si(CH_3)(X)-O]_b-Si(CH_3)_3$, KF352A, manufactured by Shin-Etsu Chemical Co., Ltd.

c4: polyether-modified polysiloxane represented by the general formula, $(CH_3)_3Si-O-[Si(CH_3)_2-O]_a-[Si(CH_3)(X)-O]_b-Si(CH_3)_3$, BYK-UV3510, manufactured by BYK Japan K.K.

c5: polyether-modified polysiloxane represented by the general formula, $(CH_3)_3Si-O-[Si(CH_3)_2-O]_a-[Si(CH_3)(X)-O]_b-Si(CH_3)_3$, BYK-377, manufactured by BYK Japan K.K.

c6: polysiloxane represented by the general formula, $(CH_3)_3Si-O-[Si(CH_3)_2-O]_a-Si(CH_3)_3$, KF-96H-12500cs, manufactured by Shin-Etsu Chemical Co., Ltd.

c7: polysiloxane represented by the general formula, $(CH_3)_3Si-O-[Si(CH_3)_2-O]_a-Si(CH_3)_2(-ROH)$, X-22-170BX, manufactured by Shin-Etsu Chemical Co., Ltd.

[(d) (Meth)Acrylic Acid Ester Skin Sensitization of which is Positive or Unknown]

d1: trimethylol propane triacrylate, M309 (marked as R43, which indicates that it is a skin sensitizing material, in the hazard classification in EU. DIRECTIVE 67/548/EEC), manufactured by TOAGOSEI CO., LTD.

d2: hexamethylene diacrylate, A-HD-N (marked as R43, which indicates that it is a skin sensitizing material, in the hazard classification in EU. DIRECTIVE 67/548/EEC), manufactured by Shin-Nakamura Chemical Co., Ltd.

d3: vinyloxyethoxyethyl acrylate, VEEA (marked as R43, which indicates that it is a skin sensitizing material, in the hazard classification in EU. DIRECTIVE 67/548/EEC), manufactured by NIPPON SHOKUBAI CO., LTD.

Each ink was subjected to the measurements of the viscosity (mPa·s) at 25° C., 45° C., and 60° C., and leveling thereof, which indicated smoothness of a coating film, was evaluated. The results are presented in Table 3.

The viscosity of each ink was measured by a cone plate-type rotary viscometer (manufactured by TOKI SANGYO CO., LTD.) with the temperature of circulating water being constantly set 25° C., 45° C., or 60° C. The temperature of 25° C. is temperature set considering typical room temperature, and the temperature of 45° C. or 60° C. is temperature set considering the specification of a commercially available heatable inkjet head, such as GEN 4, manufactured by Ricoh Industry Company, Ltd.

The photopolymerizable composition prepared with the predetermined formulation was used as it was for the evaluation performed by brush coating. For the evaluation as the inkjet ink, the photopolymerizable composition was handled in the following manner. After filtering the ink (photopolymerizable composition) through a membrane filter that was formed of a fluororesin had a pore size of 5 μm, an aluminum pouch bag having a shape illustrated in FIG. 1 was charged with the ink, and hermetically sealed so as to avoid inclusion of air bubbles. As illustrated in FIG. 2, The hermetically sealed pouch bag containing the ink was housed in a plastic cartridge. This cartridge was mounted to a casing adapted for housing it. In the casing, an ink flow channel was provided from the cartridge to a GEN 4 head (manufactured by Ricoh Industry Company, Ltd.) Then, the ink was jetted from the head to produce a solid coating film. Note that, in both cases of the brush coating and inkjet printing, the conditions were adjusted so that the solid coating film had the average thickness of about 40 μm.

After about 1 minute from the coating, the printed solid coating film produced on the commercially available polycarbonate film (Lupilon E-2000, manufactured by Mitsubishi Engineering-Plastics Corporation, thickness: 100 μm) was cured with light having a wavelength range corresponding to the UVA region, at the illuminance of 0.2 W/cm², with the light dose of each of 1,200 (mJ/cm²). The resulting coating film was provided for the coating film strength evaluation and leveling evaluation.

The coating film strength was evaluated by evaluating the scratch hardness of the solid coating film cured by the application of the light in accordance with the pencil method as specified in JIS-K-5600-5-4. The pencil hardness includes 2H, H, F, HB, B, 2B to 6B in this order from the hardest. As for the leveling, which indicated the smoothness of the coating film, the evaluation was performed by visual observation. A case where significant irregularities were observed on the surface was evaluated as C, a case where the coating film having a smooth surface was formed was evaluated as A, and a case in between was evaluated as B.

Note that, in the case where the photopolymerizable composition is used as an inkjet ink, physical properties of the ink are preferably matched to the specifications required for the inkjet head for use. Various inkjet heads are on the marked from numerous manufacturers, and among them, there are inkjet heads having a function of adjusting temperature over a wide temperature range. Considering such market trends, the viscosity of the ink at temperature of 25° C. is preferably 2 mPa·s to 150 mPa·s. In the case where the ink is ejected at 25° C., the viscosity of the ink is more preferably 5 mPa·s to 18 mPa·s. As mentioned earlier, it is possible to use the temperature adjustment function of the ejection head. In the case where the viscosity of the ink is too high at 25° C., the viscosity thereof can be reduced by optionally heating the head. Assuming that the heating condition is 45° C. or 60° C., in the aforementioned case, the viscosity of the ink at 45° C. or 60° C. is preferably 5 mPa·s to 18 mPa·s.

TABLE 3-1

| | Materials | Comp. Ex. 1 | Ex. 1 | Ex. 2 | Ex. 3 | Ex. 4 |
|---|---|---|---|---|---|---|
| a | a 1 | 95 | 95 | 95 | 95 | 95 |
| | a 2 | 5 | 5 | 5 | 5 | 5 |
| | a 3 | | | | | |
| b | b 1 | 20 | 20 | 20 | 20 | 20 |
| | b 2 | | | | | |
| | b 3 | | | | | |
| | b 4 | | | | | |
| c | c 1 | | 0.1 | 0.2 | 0.5 | 1 |
| | c 2 | | | | | |
| | c 3 | | | | | |
| | c 4 | | | | | |
| | c 5 | | | | | |
| | c 6 | | | | | |
| | c 7 | | | | | |
| d | d 1 | | | | | |
| | d 2 | | | | | |
| | d 3 | | | | | |
| Carbon black *1 | | | | | | |
| Viscosity at 25° C. (mPa·s) | | 8 | 8 | 8 | 8 | 8 |
| Viscosity at 45° C. (mPa·s) | | *2 | *2 | *2 | *2 | *2 |
| Viscosity at 60° C. (mPa·s) | | *2 | *2 | *2 | *2 | *2 |
| Inkjet printing | Set temp. of ejection head | 25° C. | 25° C. | 25° C. | 25° C. | 25° C. |
| | Coating film strength | F | F | F | H | F |
| | leveling | C | A | A | A | A |
| Brush coating | Coating film strength | F | F | F | H | F |
| | leveling | C | A | A | A | A |

TABLE 3-2

| | Materials | Comp. Ex. 2 | Ex. 5 | Ex. 6 | Ex. 7 | Ex. 8 |
|---|---|---|---|---|---|---|
| a | a 1 | 50 | 50 | 50 | 50 | 50 |
| | a 2 | 50 | 50 | 50 | 50 | 50 |
| | a 3 | | | | | |
| b | b 1 | 10 | 10 | 10 | 10 | 10 |
| | b 2 | | | | | |
| | b 3 | | | | | |
| | b 4 | | | | | |
| c | c 1 | | 0.1 | 0.2 | 0.5 | 1 |
| | c 2 | | | | | |
| | c 3 | | | | | |
| | c 4 | | | | | |
| | c 5 | | | | | |
| | c 6 | | | | | |
| | c 7 | | | | | |
| d | d 1 | | | | | |
| | d 2 | | | | | |
| | d 3 | | | | | |
| Carbon black *1 | | | | | | |
| Viscosity at 25° C. (mPa·s) | | 55 | 55 | 55 | 55 | 55 |
| Viscosity at 45° C. (mPa·s) | | 22 | 22 | 22 | 22 | 22 |
| Viscosity at 60° C. (mPa·s) | | 13 | 13 | 13 | 13 | 13 |
| Inkjet printing | Set temp. of ejection head | 60° C. | 60° C. | 60° C. | 60° C. | 60° C. |
| | Coating film strength | F | H | H | H | H |
| | leveling | C | A | A | A | A |
| Brush coating | Coating film strength | F | H | H | H | H |
| | leveling | C | A | A | A | A |

TABLE 3-2

| | Materials | Comp. Ex. 3 | Ex. 9 | Ex. 10 | Ex. 11 | Ex. 12 |
|---|---|---|---|---|---|---|
| a | a 1 | 10 | 10 | 10 | 10 | 10 |
| | a 2 | | | | | |
| | a 3 | 90 | 90 | 90 | 90 | 90 |
| b | b 1 | 20 | 20 | 20 | 20 | 20 |
| | b 2 | | | | | |
| | b 3 | | | | | |
| | b 4 | | | | | |
| c | c 1 | | 0.1 | 0.2 | 0.5 | 1 |
| | c 2 | | | | | |
| | c 3 | | | | | |
| | c 4 | | | | | |
| | c 5 | | | | | |
| | c 6 | | | | | |
| | c 7 | | | | | |
| d | d 1 | | | | | |
| | d 2 | | | | | |
| | d 3 | | | | | |
| Carbon black *1 | | | | | | |
| Viscosity at 25° C. (mPa·s) | | 18 | 18 | 18 | 18 | 19 |
| Viscosity at 45° C. (mPa·s) | | 15 | 15 | 15 | 15 | 15 |
| Viscosity at 60° C. (mPa·s) | | 9 | 9 | 9 | 9 | 9 |

TABLE 3-2-continued

| | | | | | | |
|---|---|---|---|---|---|---|
| Inkjet printing | Set temp. of ejection head | 60° C. | 60° C. | 60° C. | 60° C. | 60° C. |
| | Coating film strength | H | H | H | 2H | H |
| | leveling | C | A | A | A | A |
| Brush coating | Coating film strength | H | H | H | 2H | H |
| | leveling | C | A | A | A | A |

| | Materials | Comp. Ex. 4 | Ex. 13 | Ex. 14 | Ex. 15 | Ex. 16 |
|---|---|---|---|---|---|---|
| a | a 1 | 50 | 50 | 50 | 50 | 50 |
| | a 2 | | | | | |
| | a 3 | 50 | 50 | 50 | 50 | 50 |
| b | b 1 | 20 | 20 | 20 | 20 | 20 |
| | b 2 | | | | | |
| | b 3 | | | | | |
| | b 4 | | | | | |
| c | c 1 | | 0.1 | 0.2 | 0.5 | 1 |
| | c 2 | | | | | |
| | c 3 | | | | | |
| | c 4 | | | | | |
| | c 5 | | | | | |
| | c 6 | | | | | |
| | c 7 | | | | | |
| d | d 1 | | | | | |
| | d 2 | | | | | |
| | d 3 | | | | | |
| Carbon black *1 | | | | | | |
| Viscosity at 25° C. (mPa·s) | | 16 | 16 | 16 | 16 | 16 |
| Viscosity at 45° C. (mPa·s) | | 8 | 8 | 8 | 8 | 8 |
| Viscosity at 60° C. | | *2 | *2 | *2 | *2 | *2 |
| Inkjet printing | Set temp. of ejection head | 45° C. | 45° C. | 45° C. | 45° C. | 45° C. |
| | Coating film strength | H | H | H | 2H | H |
| | leveling | C | A | A | A | A |
| Brush coating | Coating film strength | H | H | H | 2H | H |
| | leveling | C | A | A | A | A |

TABLE 4-1

| | Materials | Comp. Ex. 5 | Ex. 17 | Ex. 18 | Ex. 19 | Ex. 20 |
|---|---|---|---|---|---|---|
| a | a 1 | 70 | 70 | 70 | 70 | 70 |
| | a 2 | 10 | 10 | 10 | 10 | 10 |
| | a 3 | 20 | 20 | 20 | 20 | 20 |
| b | b 1 | 15 | 1.5 | 15 | 15 | 15 |
| | b 2 | | | | | |
| | b 3 | | | | | |
| | b 4 | | | | | |
| c | c 1 | | 0.1 | 0.2 | 0.5 | 1 |
| | c 2 | | | | | |
| | c 3 | | | | | |
| | c 4 | | | | | |
| | c 5 | | | | | |
| | c 6 | | | | | |
| | c 7 | | | | | |
| d | d 1 | | | | | |
| | d 2 | | | | | |
| | d 3 | | | | | |
| Carbon black *1 | | | | | | |
| Viscosity at 25° C. (mPa·s) | | 14 | 14 | 14 | 14 | 14 |
| Viscosity at 45° C. (mPa·s) | | 7 | 7 | 7 | 7 | 7 |
| Viscosity at 60° C. | | *2 | *2 | *2 | *2 | *2 |
| Inkjet printing | Set temp. of ejection head | 45° C. | 45° C. | 45° C. | 45° C. | 45° C. |
| | Coating film strength | H | H | 2H | 2H | H |
| | leveling | C | A | A | A | A |
| Brush coating | Coating film strength | H | H | 2H | 2H | H |
| | leveling | C | A | A | A | A |

| | Materials | Ex. 21 | Ex. 22 | Ex. 23 | Ex. 24 |
|---|---|---|---|---|---|
| a | a 1 | 70 | 70 | 70 | 70 |
| | a 2 | 10 | 10 | 10 | 10 |
| | a 3 | 20 | 20 | 20 | 20 |
| b | b 1 | 15 | 15 | 15 | 15 |
| | b 2 | | | | |
| | b 3 | | | | |
| | b 4 | | | | |
| c | c 1 | | | | |
| | c 2 | 0.1 | 0.2 | 0.5 | 1 |
| | c 3 | | | | |
| | c 4 | | | | |
| | c 5 | | | | |
| | c 6 | | | | |
| | c 7 | | | | |
| d | d 1 | | | | |
| | d 2 | | | | |
| | d 3 | | | | |
| Carbon black *1 | | | | | |
| Viscosity at 25° C. (mPa·s) | | 14 | 14 | 14 | 14 |
| Viscosity at 45° C. (mPa·s) | | 7 | 7 | 7 | 7 |
| Viscosity at 60° C. | | *2 | *2 | *2 | *2 |
| Inkjet printing | Set temp. of ejection head | 45° C. | 45° C. | 45° C. | 45° C. |
| | Coating film strength | H | 2H | 2H | H |
| | leveling | A | A | A | A |
| Brush coating | Coating film strength | H | 2H | 2H | H |
| | leveling | A | A | A | A |

TABLE 4-2

| | Materials | Ex. 25 | Ex. 26 | Ex. 27 | Ex. 28 | Ex. 29 | Ex. 30 | Ex. 31 |
|---|---|---|---|---|---|---|---|---|
| a | a 1 | 70 | 70 | 70 | 70 | 70 | 70 | 70 |
| | a 2 | 10 | 10 | 10 | 10 | 10 | 10 | 10 |
| | a 3 | 20 | 20 | 20 | 20 | 20 | 20 | 20 |
| b | b 1 | 15 | 15 | 15 | 15 | 15 | 15 | 15 |
| | b 2 | | | | | | | |
| | b 3 | | | | | | | |
| | b 4 | | | | | | | |

TABLE 4-2-continued

| | Materials | Ex. 25 | Ex. 26 | Ex. 27 | Ex. 28 | Ex. 29 | Ex. 30 | Ex. 31 |
|---|---|---|---|---|---|---|---|---|
| c | c 1 | | | | | | | |
| | c 2 | | | | | | | |
| | c 3 | 0.1 | 0.2 | 0.5 | 1 | | | |
| | c 4 | | | | | 0.1 | 0.2 | 0.5 |
| | c 5 | | | | | | | |
| | c 6 | | | | | | | |
| | c 7 | | | | | | | |
| d | d 1 | | | | | | | |
| | d 2 | | | | | | | |
| | d 3 | | | | | | | |
| Carbon black *1 | | | | | | | | |
| Viscosity at 25° C. (mPa · s) | | 14 | 14 | 14 | 15 | 14 | 14 | 14 |
| Viscosity at 45° C. (mPa · s) | | 7 | 7 | 7 | 7 | 7 | 7 | 7 |
| Viscosity at 60° C. | | *2 | *2 | *2 | *2 | *2 | *2 | *2 |
| Inkjet printing | Set temp. of ejection head | 45° C. | 45° C. | 45° C. | 45° C. | 45° C. | 45° C. | 45° C. |
| | Coating film strength | H | 2H | 2H | H | H | 2H | 2H |
| | leveling | A | A | A | A | A | A | A |
| Brush coating | Coating film strength | H | 2H | 2H | H | H | 2H | 2H |
| | leveling | A | A | A | A | A | A | A |

TABLE 5-1

| | Materials | Ex. 32 | Ex. 33 | Ex. 34 | Ex. 35 | Ex. 36 | Comp. Ex. 6 | Comp. Ex. 7 |
|---|---|---|---|---|---|---|---|---|
| a | a 1 | 70 | 70 | 70 | 70 | 70 | 70 | 70 |
| | a 2 | 10 | 10 | 10 | 10 | 10 | 10 | 10 |
| | a 3 | 20 | 20 | 20 | 20 | 20 | 20 | 20 |
| b | b 1 | 15 | 15 | 15 | 15 | 15 | 15 | 15 |
| | b 2 | | | | | | | |
| | b 3 | | | | | | | |
| | b 4 | | | | | | | |
| c | c 1 | | | | | | | |
| | c 2 | | | | | | | |
| | c 3 | | | | | | | |
| | c 4 | 1 | | | | | | |
| | c 5 | | 0.1 | 0.2 | 0.5 | 1 | | |
| | c 6 | | | | | | 0.5 | |
| | c 7 | | | | | | | 0.5 |
| d | d 1 | | | | | | | |
| | d 2 | | | | | | | |
| | d 3 | | | | | | | |
| Carbon black *1 | | | | | | | | |
| Viscosity at 25° C. (mPa · s) | | 14 | 14 | 14 | 15 | 14 | *4 | 14 |
| Viscosity at 45° C. (mPa · s) | | 7 | 7 | 7 | 7 | 7 | *4 | 7 |
| Viscosity at 60° C. | | *2 | *2 | *2 | *2 | *2 | *4 | *2 |
| Inkjet printing | Set temp. of ejection head | 45° C. | 45° C. | 45° C. | 45° C. | 45° C. | *4 | 45° C. |
| | Coating film strength | 2H | H | 2H | 2H | 2H | *4 | H |
| | leveling | A | A | A | A | A | *4 | B |
| Brush coating | Coating film strength | 2H | H | 2H | 2H | 2H | *4 | H |
| | leveling | A | A | A | A | A | *4 | B |

TABLE 5-2

| | Materials | Ex. 37 | Ex. 38 | Ex. 39 | Ex. 40 | Comp. Ex. 8 | Ex. 41 | Comp. Ex. 9 | Ex. 42 |
|---|---|---|---|---|---|---|---|---|---|
| a | a 1 | 70 | 70 | 70 | 70 | 70 | 70 | | |
| | a 2 | 10 | 10 | 10 | 10 | 10 | 10 | | |
| | a 3 | 20 | 20 | 20 | 20 | 20 | 20 | | |
| b | b 1 | | | | 15 | 15 | 15 | 10 | 10 |
| | b 2 | 15 | 13 | | | | | | |
| | b 3 | | 2 | | | | | | |
| | b 4 | | | 15 | | | | | |
| c | c 1 | 0.5 | 0.5 | 0.5 | 4 | | 0.5 | | 0.5 |
| | c 2 | | | | | | | | |
| | c 3 | | | | | | | | |
| | c 4 | | | | | | | | |
| | c 5 | | | | | | | | |
| | c 6 | | | | | | | | |
| | c 7 | | | | | | | | |
| d | d 1 | | | | | | | 40 | 40 |
| | d 2 | | | | | | | 40 | 40 |
| | d 3 | | | | | | | 20 | 20 |
| Carbon black *1 | | | | | | 1 | 1 | | |
| Viscosity at 25° C. (mPa·s) | | 14 | 15 | 23 | 15 | 16 | 16 | 14 | 14 |
| Viscosity at 45° C. (mPa·s) | | 8 | 8 | 10 | 8 | 9 | 9 | 8 | 8 |
| Viscosity at 60° C. | | *2 | *2 | *2 | *2 | *2 | *2 | *2 | *2 |
| Inkjet printing | Set temp. of ejection head | 45° C. | 45° C. | 45° C. | 45° C. | 45° C. | 45° C. | 45° C. | 45° C. |
| | Coating film strength | 2H | 2H | 2H | F | H*3 | 2H*3 | 2H | 2H |
| | leveling | A | A | A | A | C | A | C | A |
| Brush coating | Coating film strength | 2H | F | 2H | F | H*3 | 2H*3 | 2H | 2H |
| | leveling | A | A | A | A | C | A | C | A |

*1: carbon black "#10" manufactured by Mitsubishi Chemical Corporation blended with a dispersing agent "Solsperse 32000" manufactured by Lubrizol Japan Co. are blended at the weight ratio of 3/1

*2: The measurement of the viscosity was not performed, as the ink could be ejected at the temperature lower than the described temperature.

*3: As the curing was insufficient at the illuminance of 1,200 mJ/cm², the curing was performed at 2,000 mJ/cm². Note that, as it was difficult to cure the 40 μm-thick coating film at once, the film having a thickness of 10 μm was cured and laminated to form a film of 40 μM.

*4: The evaluation could not be performed as it was not homogeneously dissolved.

Examples 2 to 8, Comparative Examples 1 to 2

Each of inks of Examples 2 to 8 and inks of Comparative Examples 1 to 2 was similarly obtained by blending the materials of (a) to (d) with the blending ratio as presented in Table 3-1.

Each of the obtained inks was subjected to the measurements of the measurements of the viscosity (mPa·s) at 25° C., 45° C., and 60° C., and leveling thereof, which indicated smoothness of a coating film, was evaluated in the same manner as in Example 1. The results are presented in Table 3-1.

Examples 9 to 16, Comparative Examples 3 to 4

Each of inks of Examples 9 to 16 and inks of Comparative Examples 3 to 4 was similarly obtained by blending the materials of (a) to (d) with the blending ratio (unit for the numerical value: part(s) by mass) as presented in Table 3-2.

Each of the obtained inks was subjected to the measurements of the measurements of the viscosity (mPa·s) at 25° C., 45° C., and 60° C., and leveling thereof, which indicated smoothness of a coating film, was evaluated in the same manner as in Example 1. The results are presented in Table 3-2

Examples 17 to 24, Comparative Example 5

Each of inks of Examples 17 to 24 and Comparative Example 5 was similarly obtained by blending the materials of (a) to (d) with the blending ratio (unit for the numerical value: part(s) by mass) as presented in Table 4-1.

Each of the obtained inks was subjected to the measurements of the measurements of the viscosity (mPa·s) at 25° C., 45° C., and 60° C., and leveling thereof, which indicated smoothness of a coating film, was evaluated in the same manner as in Example 1. The results are presented in Table 4-1

Examples 25 to 31

Each of inks of Examples 25 to 31 was similarly obtained by blending the materials of (a) to (d) with the blending ratio (unit for the numerical value: part(s) by mass) as presented in Table 4-2.

Each of the obtained inks was subjected to the measurements of the measurements of the viscosity (mPa·s) at 25° C., 45° C., and 60° C., and leveling thereof, which indicated smoothness of a coating film, was evaluated in the same manner as in Example 1. The results are presented in Table 4-2

Examples 32 to 36, Comparative Examples 6 to 7

Each of inks of Examples 32 to 36 and inks of Comparative Examples 6 to 7 was similarly obtained by blending the materials of (a) to (d) with the blending ratio (unit for the numerical value: part(s) by mass) as presented in Table 5-1. Each of the obtained inks was subjected to the measurements of the measurements of the viscosity (mPa·s) at 25° C., 45° C., and 60° C., and leveling thereof, which indicated smoothness of a coating film, was evaluated in the same manner as in Example 1. The results are presented in Table 5-1

Examples 37 to 42, Comparative Examples 8 to 9

Each of inks of Examples 37 to 42 and inks of Comparative Examples 8 to 9 was similarly obtained by blending the materials of (a) to (d) with the blending ratio (unit for the numerical value: part(s) by mass) as presented in Table 5-2. Each of the obtained inks was subjected to the measurements of the measurements of the viscosity (mPa·s) at 25° C., 45° C., and 60° C., and leveling thereof, which indicated smoothness of a coating film, was evaluated in the same manner as in Example 1. The results are presented in Table 5-2

As it has been made clear from Examples 1 to 36, it has been confirmed that leveling is improved as well as the coating film strength by adding the polyether-modified polysiloxane compound to the photopolymerizable composition, so that an appearance of a coating film is improved. As for the coating film strength, confirmed are the case where the improvement thereof can be improved regardless of the blending ratio, and the case where the coating film strength is improved with a certain blending ratio. Monomer materials selected under the consideration of skin sensitization tend to be difficult to go through a polymerization reaction, and there is a limitation on acceleration of the polymerization reaction, which is fundamental for exhibiting sufficient coating film strength. Therefore, it is desired to improve the coating film strength using various other methods in combination. However, an effect for improving the coating film strength, which is obtained by adding a small amount of the polyether-modified polysiloxane compound as additive, is very effective.

As in Examples 17 to 36, the same effect can be obtained with a different type of the polyether-modified polysiloxane compound, and therefore an optimal polyether-modified polysiloxane compound can be selected to match various specifications required, other than leveling and coating film strength. As in Comparative Examples 6 and 7, however, in the case where the polyether-modified polysiloxane compound has a different molecular structure, solubility thereof may be poor, or an effect of improving leveling or coating film strength may be insufficient. Therefore, it is important that the polyether-modified polysiloxane compound represented by the general formula of $(CH_3)_3Si-O-[Si(CH_3)_2-O]a-[Si(CH_3)(X)-O]_b-Si(CH_3)_3$ (provided that, $X=-R(C_2H_4O)c(C_3H_6O)d-R'$, R is a single bond or an alkylene group, R' is a hydrogen atom or an alkyl group, and, a to d each denote the average polymerization degree) is used.

As it is clear from Examples 37 to 39, even when a different type of compound is used as the polymerization initiator, the same effect can be attained. Therefore, an optimal compound can be selected as the polymerization initiator to match various specifications required, other than leveling and coating film strength. However, use of 2-hydroxy-1-{4-[4-(2-hydroxy-2-methylpropionyl)benzyl]phenyl}-2-methyl-1-propan-1-one, which is marked with a symbol mark "Xn" that indicates health hazard, a symbol mark "N" that indicates environmental hazard, and a risk phrase "R48/22" that indicates acute lethal effect, and a risk phrase "R50/53" that indicates acute aquatic toxicity and long-term adverse effect in the hazard classification of EU. Directive 67/548/EEC, is preferably kept as minimum as possible. Use of 1-hydroxycyclohexyl phenyl ketone, 2-hydroxy-2-methyl-1-phenylpropan-1-one, or oligo[2-hydroxy-2-methyl-1{4-(1-methylvinyl)phenyl}propanone], which are not marked with a symbol mark or risk phrase in the aforementioned hazard classification, is preferable.

Example 40 is the case where a large amount of the polyether-modified polysiloxane compound is blended. The improvement in the leveling can be confirmed because of the blending, but the coating film strength is reduced. In view of the coating film strength, it is not preferable to blend an excessive amount of the polyether-modified polysiloxane compound. In the case where the coating film strength is not important, however, a blending amount thereof can be optimized to match various specifications required, such as leveling.

As it is clear from Example 41, even in the case where the photopolymerizable composition contains the colorant, it has been confirmed that the leveling and coating film strength are improved by appropriately selecting the curing conditions.

As in Examples 5 to 8, and 17 to 36, even when the blending ratio of the polymerization initiator is reduced, the coating film strength can be maintained by appropriately adjusting a blending amount of the caprolactone-modified dipentaerythritol hexaacrylate, which is polyfunctional acrylate having high polymerization reactivity, and selecting optimal irradiation conditions. Therefore, the reduction in the blending amount of the polymerization initiator, which is more expensive than the monomer that is a main component, can achieve cost saving for production of the photopolymerizable composition.

As in Example 42, in the case where the monomer material that is not negative for skin sensitization is used, such monomer material has excellent polymerization reactivity, and therefore the blending amount of the polymerization initiator can be reduced, which is excellent. In this case, it has been also confirmed that use of the polyether-modified polysiloxane compound in the photopolymerizable composition improves leveling and appearance of a resulting coating film. Considering safety of operators, use of a material, which is not negative for skin sensitization, is not preferable, and therefore use of such material is kept as minimum as possible.

Note that, the ethylene oxide-modified trimethylol propane trimethacrylate is represented by the general formula $[CH_3CH_2C-\{(O-CH_2CH_2)_n-OCOC(CH_3)=CH_2\}_3]$. Regarding the length "n" of the ethylene oxide segment, the larger value of "n" means a lager molecular weight, which increases the viscosity. Therefore, such ethylene oxide-modified trimethylol propane trimethacrylate is difficult to be used as a material for an inkjet ink, and also increases a molecular weight between crosslink points in a crosslinked polymer structure formed during curing to reduce the crosslink density. As a result, it is difficult to attain sufficient coating strength. Therefore, the value of n is preferably as small as possible. On the other hand, trimethylol propane trimethacrylate, in which the value of n is 0 (n=0), is a compound marked with a symbol "N" that denotes the environmental hazard and marked with a risk phrase "R51/53" that denotes acute aquatic toxicity and long-term adverse effect in the classification according to EU. Directive 67/548/EEC. Considering a possible influence to the environment, therefore, use of trimethylol propane trimethacrylate is preferably avoided. The ethylene oxide-modified trimethylol propane trimethacrylate used in Examples has 1 as the value of n (n=1), which is not particularly problem in a viscosity as a raw material blended in an inkjet ink. The photopolymerizable composition to which this ethylene oxide-modified trimethylol propane trimethacrylate is blended has sufficient coating film strength and no problem of skin sensitization, and is not classified as a material exhibiting the environmental hazardless, or acute aquatic toxicity and long-term adverse effect. Accordingly, as for the ethylene oxide-modified trimethylol propane trimethacrylate, that of n=1 is particularly preferable.

In all of Examples and Comparative Examples, no significant difference has not been seen between inkjet printing and brush coating. Moreover, inclusion of air bubbles in the ink channel in the inkjet system should be avoided, as the inclusion of the air bubbles adversely affects ejection of the ink. However, in all of Comparative Examples and Examples, it has not been necessary to take any consideration in the operation process by which air bubbles can be easily included, such as loading the ink. Moreover, all the photopolymerizable compositions have very weak odor, to which any particular consideration should be taken in handling thereof. Note that, the siloxane compound is a substance disclosed as a cosmetic material in "Guideline for Labeling Name Preparation, Japan Cosmetic Industry Association" and therefore the skin sensitization of the siloxane compound is sufficiently low compared to various products typically used in a photopolymerizable composition.

The embodiments of the present invention are, for example, as follows:

<1> A non-aqueous photopolymerizable composition containing:
  a polymerizable monomer;
  a polymerization initiator; and
  a polyether-modified polysiloxane compound represented by the following general formula (1):

<General Formula (1)> where X represents $R(C_2H_4O)_c(C_3H_6O)_d$—R', R is a single bond or an alkylene group, R' is a hydrogen atom or an alkyl group, and a to d each denote an average polymerization degree including a case where either c or d is 0.

<2> The non-aqueous photopolymerizable composition according to <1>, wherein the polymerizable monomer is negative for skin sensitization.

<3> The non-aqueous photopolymerizable composition according to <2>, wherein the polymerizable monomer contains diethylene glycol dimethacrylate.

<4> The non-aqueous photopolymerizable composition according to any one of <1> to <3>, wherein an amount of the polyether-modified polysiloxane compound represented by the general formula (1) is 0.1 parts by mass or greater relative to 100 parts by mass of the polymerizable monomer.

<5> The non-aqueous photopolymerizable composition according to any one of <1> to <4>, wherein the polymerizable monomer further contains caprolactone-modified dipentaerythritol hexaacrylate.

<6> The non-aqueous photopolymerizable composition according to any one of <1> to <5>, wherein the polymerization initiator is 1-hydroxycyclohexyl phenyl ketone, 2-hydroxy-2-methyl-1-phenylpropan-1-one, or oligo[2-hydroxy-2-methyl-1{4-(1-methylvinyl)phenyl}propanone].

<7> The non-aqueous photopolymerizable composition according to any one of <1> to <6>, wherein an amount of the polymerization initiator is 10 parts by mass or greater relative to 100 parts by mass of the polymerizable monomer.

<8> An inkjet ink, containing:
  the photopolymerizable composition according to any one of <1> to <7>.

<9> An ink cartridge, containing:
  the inkjet ink according to <8>; and
  a container.

REFERENCE SIGNS LIST 200 ink cartridge
241 ink bag
242 ink inlet
243 ink outlet
244 cartridge case

The invention claimed is:

1. An inkjet ink, comprising a photopolymerizable composition,
  wherein the photopolymerizable composition comprises:
  a polymerizable monomer;
  a polymerization initiator; and
  a polyether-modified polysiloxane compound of formula (1):

General Formula (1),

X is $R(C_2H_4O_c)(C_3H_6O)_d$—R',
R is a single bond or an alkylene group,
R' is a hydrogen atom or an alkyl group,
a to d are each an average polymerization degree,
c or d is optionally 0,
the polymerizable monomer consists of 50 parts by mass or more of diethylene glycol dimethacrylate and from greater than 0 to 50 parts by mass in total of caprolactone dipentaerythritol hexaacrylate, ethylene oxide-modified trimethylol propane trimethacrylate, or both, relative to 100 parts by mass of the polymerizable monomer, and
the inkjet ink has a viscosity of at most 18 mPa·s at 60° C.

2. The inkjet ink according to claim 1, wherein an amount of the polyether-modified polysiloxane compound of formula (1) is 0.1 parts by mass or greater relative to 100 parts by mass of the polymerizable monomer.

3. The inkjet ink according to claim 1, wherein a content of caprolactone dipentaerythritol hexaacrylate in the polymerizable monomer is from greater than 0 to 50 parts by mass in total, relative to 100 parts by mass of the polymerizable monomer.

4. The inkjet ink according to claim 1, wherein the polymerization initiator is 1-hydroxycyclohexyl phenyl ketone, 2-hydroxy-2-methyl-1-phenylpropan-1-one, or oligo[2-hydroxy-2-methyl-1{4-(1-methylvinyl)phenyl}propanone].

5. The inkjet ink according to claim 4, wherein the polymerization initiator is oligo[2-hydroxy-2-methyl-1{4-(1-methylvinyl)phenyl}propanone].

6. The inkjet ink according to claim 1, wherein an amount of the polymerization initiator is 10 parts by mass or greater relative to 100 parts by mass of the polymerizable monomer.

7. An ink cartridge, comprising:
the inkjet ink according to claim 1; and
a container.

8. An inkjet ejection device comprising:
the ink cartridge according to claim 7.

9. The inkjet ink of claim 1, wherein the photopolymerizable composition comprises no solvent.

10. The inkjet ink according to claim 1, wherein the inkjet ink has a viscosity of 5 mPa·s to 18 mPa·s at 25° C.

11. An ink ejection method comprising:
applying to a base the inkjet ink according to claim 1.

12. The ink ejection method according to claim 11, wherein the applying is performed by inkjet ejection or coating.

13. The ink ejection method according to claim 11, wherein the base is a non-absorbent base.

14. An ink ejection method comprising:
applying to a base the inkjet ink according to claim 1.

15. The ink ejection method according to claim 14, wherein the applying is performed by inkjet ejection or coating.

16. The ink ejection method according to claim 14, wherein the base is a non-absorbent base.

17. The inkjet ink of claim 1, wherein the inkjet ink has a viscosity of from 5 to 18 mPa·s at 60° C.

18. The inkjet ink of claim 1, wherein the inkjet ink has a viscosity of at most 13 mPa·s at 60° C.

19. The inkjet ink of claim 1, wherein the inkjet ink has a viscosity of at most 12 mPa·s at 60° C.

20. The inkjet ink of claim 1, wherein a Stimulation Index (SI value) of the polymerizable monomer is less than 3.

* * * * *